(12) United States Patent
King et al.

(10) Patent No.: US 8,661,046 B2
(45) Date of Patent: Feb. 25, 2014

(54) USING A CONTENT DATABASE TO INFER CONTEXT INFORMATION FOR ACTIVITIES FROM MESSAGES

(75) Inventors: Tracy Holloway King, Mountain View, CA (US); Kurt E. Partridge, Palo Alto, CA (US); Nicolas Ducheneaut, Sunnyvale, CA (US); Ji Fang, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 803 days.

(21) Appl. No.: 11/856,874

(22) Filed: Sep. 18, 2007

(65) Prior Publication Data
US 2009/0077027 A1    Mar. 19, 2009

(51) Int. Cl.
*G06F 7/00* (2006.01)
*G06F 15/16* (2006.01)

(52) U.S. Cl.
USPC .......................................... 707/755; 709/207

(58) Field of Classification Search
USPC ................... 707/2, 3, 102, 5–7, 755; 709/207
See application file for complete search history.

(56) References Cited

U.S. PATENT DOCUMENTS

| | | | | |
|---|---|---|---|---|
| 7,389,290 | B2* | 6/2008 | Adar et al. | 707/7 |
| 7,664,740 | B2* | 2/2010 | Starbuck et al. | 707/706 |
| 2004/0225667 | A1* | 11/2004 | Hu et al. | 707/100 |
| 2005/0076037 | A1* | 4/2005 | Shen | 707/100 |
| 2008/0288573 | A1* | 11/2008 | Bellotti et al. | 709/201 |
| 2008/0294607 | A1* | 11/2008 | Partovi et al. | 707/3 |

* cited by examiner

*Primary Examiner* — Etienne Leroux
*Assistant Examiner* — Chelcie Daye
(74) *Attorney, Agent, or Firm* — Shun Yao; Park, Vaughan, Fleming & Dowler LLP

(57) ABSTRACT

Some embodiments of the present invention provide a system that infers activity-related context information from a message. Upon receiving the message, the system looks for activity-related keywords in the message, wherein the activity-related keywords are from a content database. If one or more activity-related keywords are found in the message, the system infers message-related context information from the one or more activity-related keywords. Next, the system uses the message-related context information to facilitate recommending an activity to a user.

21 Claims, 3 Drawing Sheets

USING A CONTENT DATABASE TO INFER CONTEXT INFORMATION FOR ACTIVITIES FROM MESSAGES

BACKGROUND

1. Field

The present invention generally relates to natural language processing (NLP) techniques. More specifically, the present invention relates to a method and an apparatus which uses an activity-related content database to infer context information for activities from messages.

2. Related Art

Online calendars support many useful functions, such as coordinating activities, reminding users, and scheduling tasks. However, online calendars often do not accurately reflect a user's actual activities. One reason for this inconsistency is that a user often does not record future activities in an online calendar. As a result, the user may forget about an intended appointment. However, users do frequently communicate their plans for activities through electronic messages, such as email or text messages. Sometimes these electronic messages can be parsed through natural language processing techniques to obtain this information, but often they cannot be parsed because the electronic messages typically contain a terse description of an event (e.g., "nemo tonight?"), rather than a detailed description that contains all of the relevant information for a calendar entry (e.g., "Want to meet at the Century Cinemas 16, 1500 N. Shoreline Blvd., Mountain View, Calif., to see the movie 'Finding Nemo' from 7:15 pm to 9:00 pm tonight?").

The task of producing recommendations relating to activities is also challenging because users do not typically record preference information for such activities. However, in theory, user-preference information can similarly be obtained by parsing electronic messages from users. However, it is similarly difficult to parse such user-preference information because of the terse descriptions of such activities.

Hence, what is needed is a method and an apparatus that facilitates automatically obtaining activity-related information from electronic communications without the above-described problems. The proposed system uses a content database to guide and aid the extraction of activity-related information.

SUMMARY

Some embodiments of the present invention provide a system that infers activity-related context information from a message. Upon receiving the message, the system looks for activity-related keywords in the message, wherein the activity-related keywords are from a content database. If one or more activity-related keywords are found in the message, the system infers message-related context information from the one or more activity-related keywords. Next, the system uses the message-related context information to facilitate recommending an activity to a user.

In some embodiments, while using the message-related context information to facilitate recommending an activity to the user, the system uses the message-related context information to construct an activity model for one or more activities associated with the message-related context information. The system also uses the message-related context information to construct a user-preference model for the user. Finally, the system uses the activity model and the user-preference model to recommend an activity to the user.

In some embodiments, while looking for the activity-related keywords in the message and as guided by the content database, the system looks for surrounding text which indicates the presence of the activity-related keywords in the message. For example, this can involve looking for verbs which indicate specific types of activities in text surrounding prospective activity-related keywords.

In some embodiments, the system also identifies location and time indicators in the message and uses the identified location and time indicators to facilitate recommending an activity to the user.

In some embodiments, using the message-related context information to facilitate recommending the activity to the user involves using the message-related context information as well as the content database to enhance a keyword search to identify activities of interest for the user.

In some embodiments, the message-related context information includes typed terms.

In some embodiments, the typed terms are associated with confidence weights.

In some embodiments, the typed terms can include: an activity category; an activity location; an activity time; an uncertainty for the activity time; a tense associated with the message; and a user opinion about the activity.

In some embodiments, the content database includes activity-specific content related to one or more of the following activities: eating at restaurants; seeing movies and/or live performances; shopping at physical or online stores; reading books or online content; and performing other activities.

In some embodiments, the message can be a text message or an email message.

DETAILED DESCRIPTION

Figure 1:
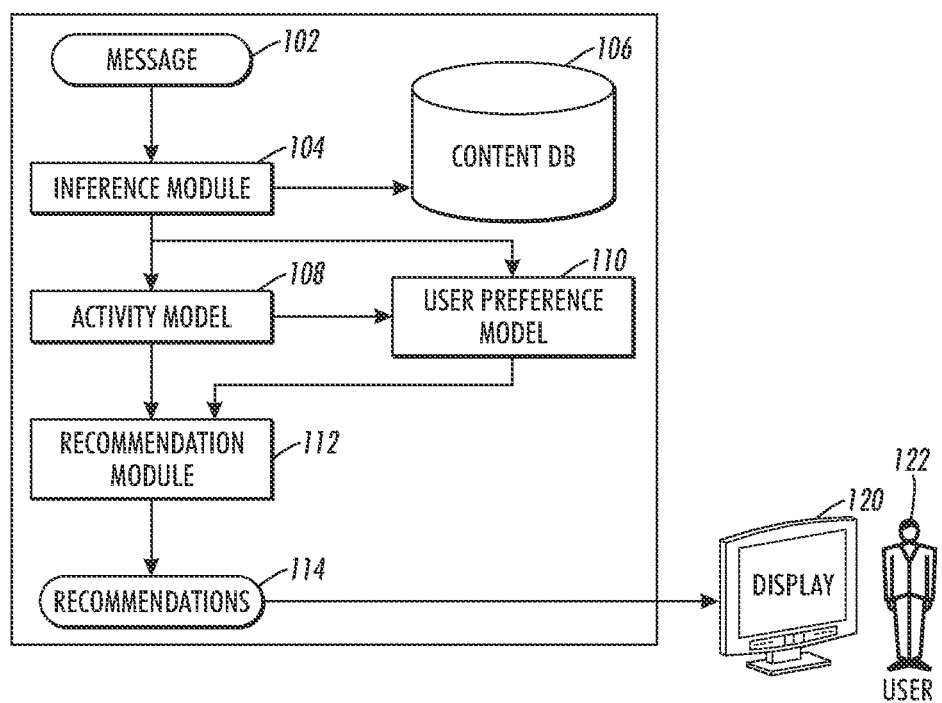
FIG. 1 illustrates a computer system in accordance with an embodiment of the present invention.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a system that uses natural language processing (NLP) techniques to infer message-related context information from a corpus of messages (SMS, email, etc.) based on a database of content. This system uses the database to guide what kind of contextual information is looked for (e.g., if the system has a content about restaurants, it will look for keywords having to do with dining, going to restaurants, cuisine types, etc). Hence, this goes beyond looking simply for indicators of location, time, etc.

One embodiment of the present invention uses a set of activity-specific content databases. For example, the system can use databases that contain content about movies, restaurants, and parks.

When a message (such as a text message or an email message) is analyzed, entries in the database provide a set of keywords to look for. For example, in the case of a movie database, the titles of movies can become keywords. In one embodiment of the present invention, these database-stored keywords are used both (1) as simple keywords that cause a message to be flagged if the keywords appear, and (2) as context-dependent keywords that cause more weight to be given to the message classification type if the surrounding text is indicative of a relevant type of content.

Consider the following simplified example. A movie database may contains the movie titles "Batman", "Finding Nemo", and "1984". Whenever one of these phrases is encountered, the message is marked as related to movies with the title of the relevant movie indicated. However, if the title phrase is preceded by the words "see" or "watch", or if this title phrase appears earlier in a message thread of the movie, then the weight of the movie facts associated with the message are increased. This is particularly important for movie-related content because titles can be ordinary phrases. In the example above "1984" could refer to a year ("she graduated in 1984"). Hence, the data within a content database is used to signal that keywords relevant to this type of content should be flagged. Hence, an application that references both the movie and restaurant databases can mark messages with keywords related to movies and restaurants, as well as marking movie and restaurant names from the database. A different application can reference hotel, train, and restaurant databases and can hence use these domains to generate relevant keywords to flag messages.

The keywords associated with a database can be generated by hand-written rules and/or by stochastic methods. These rules not only contain keywords in the classic sense (e.g., "movie", "film", "see"), but can also contain phrasal and positional information. For example, the phrase "see a film" would receive a very high weight, as would the word "see" followed immediately by the name of a movie in the database. In contrast, the word "see" preceded by the name of a movie would receive a much lower weight.

Content information can be extracted from isolated messages as well as from message threads. Note that message threads can be exploited to increase the likelihood of the content being relevant. For example, if a message with content of type X is in the same thread as one with content of type X, then the likelihood of the content type is increased. Moreover, the closer the messages are in the thread, the greater the increase in the likelihood weight. For example, if a sent message contains the name of a restaurant and is in response to a message about eating out, then the confidence score of the name being the name of a restaurant is significantly increased.

In one embodiment of the present invention, the information extracted by the system includes relevant, typed terms associated with each message. As mentioned above, these typed terms can have confidence weights. Note that messages can be associated with terms from more than one database. Hence, even a short SMS or text message may contain information about movies and locations. Longer email messages, for example, may contain both movie and restaurant information. As an example, an email asking the recipient if they want to go to dinner and see a movie could be associated with terms like: type=movie; title=batman; time=today; type=restaurant; name=giovanni's; cuisine=Italian; time=today. In this example, the "type=" information comes from the keywords associated with the application-specific database, the "title=" and "name=" are keywords from the database entries, the "cuisine=" is additional database information, and the "time=" is obtained through traditional keyword extraction from the message.

Note that although the described embodiments of the present invention are specific to the English language, the technique can generally be applied to any language.

Text messages typically require some application-specific NLP techniques to translate common abbreviations in such messages (this holds somewhat less so for email messages). Some of the translations can be defined in a list. For example, in an English text message, the character "2" can be translated into the strings "to", "two" or "too" and as such may be important in providing positional information that increases the likelihood that a message contains relevant content. Other translations can be more systematic. For example, in English text message vowels can be dropped (e.g., "talk" can become "tlk") and letters can be substituted (e.g. "x" for "ks"). Such systematic translation rules can be useful in correctly identifying positional context information and the keywords themselves.

Finally, during interactions with content databases, ways in which names can be referred to are important for correctly matching database content with the message text. For example, in movie titles either the title or the subtitle may be used (e.g., "Fantastic Four: Rise of the Silver Surfer" can be "Silver Surfer" in a message). In restaurant names, words like "Cafe" and "Restaurant" are often dropped (e.g. "Giovanni's Cafe" can be "Giovanni's"). More general word alterations (such as dropping vowels) can be applied to the database keywords and their abbreviations. As such, the system can take into account the combinations of these variations in order to correctly identify the keywords.

In one embodiment of the present invention, this content-extraction technique can be used in a number of ways. More specifically, the technique can be used in an offline application to help build a user preference model. For example, a large corpus of messages can be analyzed to build up models of relevant activity patterns. If the application uses restaurant, movie, and shopping databases, then information can be extracted for each user as to when they are eating in restaurants, watching movies, or shopping.

Moreover, it is possible to extract information as to when people are planning such activities. For example, such information can be extracted if a user routinely emails a friend in the early afternoon to set up plans for that evening's dining activities.

In addition to the coarse-grained classification corresponding to the main content database classes (e.g., restaurants, movies, shopping), the content extraction from messages can provide finer-grained information about the specific types of content used in a specific database. For example, the titles of movies can be used to learn movie-genre preferences and the names of restaurants to use cuisine-type preferences. This allows the model to learn more precise patterns and preferences by combining the extracted message content with the information stored in the database about subtype classifications. Thus, a user preference model can be enhanced by message content both about what the user is physically doing and about what plans the user is making for given times of given days.

The content-extraction technique can also be used in an on-line manner to facilitate recommending activities or content to the user. In this case, if the user has a message (sent or received) that is related to the database content and activities, the system can use the terms and weights extracted from the message as factors in determining what activities to recommend, or to provide content suggestions for activities the system thinks that the user participates in. For example, if there is a message arranging a place to eat, the system could provide the user with restaurant recommendations from the database.

In another example, assume the system has models indicating that users often go to discos or to movies in the afternoon. In this case, if a user has a general message asking about evening plans, the system could recommend a going to a disco or a movie.

The content-extraction technique can also be used to fill in scheduling details when they are not available in a message. For example, a movie might be identified because the movie title matches words in the body of the message, but the time is obtained from a database of possible times for local movie showings.

We next present some implementation details for the above-described techniques.

Computer System

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a cell phone, a device controller, or a computational engine within an appliance.

Referring to FIG. 1, computer system 100 processes a message 102 using inference module 104. Note that message 102 can generally be any type of electronic communication, such as an email message or a text message.

While processing message 102, inference module 104 accesses content database 106. In one embodiment of the present invention, content database 106 includes one or more activity-specific databases. For example, these activity-specific databases can includes a database for movies, a database for restaurants and a database for retailers. Inference module 104 also uses information from content database 106 to infer information about activities discussed in message 102. This process is described in more detail below.

The output from inference module 104 feeds into activity model 108, which can be used to determine whether users are interested in specific activities.

Information from inference module 104 also feeds into a user-preference model 110, which keeps track of preferences for a specific user.

Activity model 108 and user-preference model 110 are used by recommendation module 112 to generate recommendations 114, which can be viewed by user 122 through display 120. The process of generating recommendations is described in more detail below.

Making a Recommendation

Figure 2:
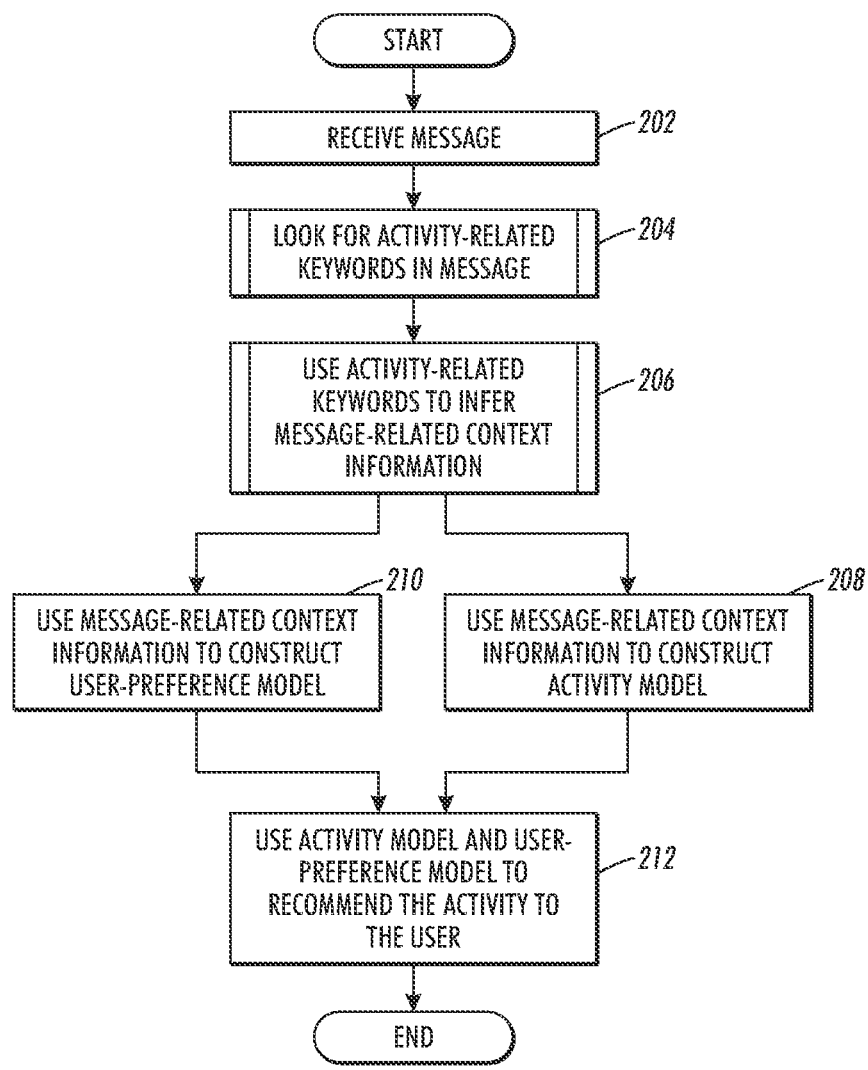
FIG. 2 presents a flow chart illustrating the process of making a recommendation in accordance with an embodiment of the present invention.

FIG. 2 presents a flow chart illustrating the process of making a recommendation in accordance with an embodiment of the present invention. First, the system receives a message 102, such as an email message or a text message (step 202). Next, the system looks for activity-related keywords in the message (step 204), where the activity-related keywords are contained in content database 106. The system then uses the activity-related keywords to infer message-related context information (step 206). For example, if the system sees the keywords "finding" and "nemo" in a text message, the system can infer that the text message is discussing the movie "Finding Nemo."

The system also uses the message-related context information from message 102 (and typically numerous additional messages) to help in constructing activity model 108 (step 208). In doing so, the system analyzes the content of sent and received email messages to extract information about the user's plans for future activities. The extracted information is then delivered to the activity model 108 and is used as additional clues to infer the probability of the user's interest in specific activities at specific times.

For example, in one embodiment of the present invention, the system computes the probability that the user is interested in information about a number of top-level activities (EAT, BUY, SEE, DO and READ), based on the system's belief that the user will engage in those activities in the near future. This inference can be based on a combination of patterns observed in a demographically similar segment of the population and the user's individual personal behavior history. The system can infer likely engagement in an activity by associating the visitation of certain types of venues with specific activities. For example, if the user visits a retail store, the system infers the user is engaging in the BUY activity. In another example, if the user visits a restaurant or cafe the system can infer the user is engaging in the EAT activity. Similarly, visiting a theater or museum can be associated with the SEE activity; visiting a gym can be associated with the DO activity; and reading content on the device itself can be associated with the READ activity.

The system also uses this message-related context information to help in constructing a user-preference model 110 (step 210), which indicates the user's individual tastes and preferences. In one embodiment of the present invention, user-preference module 110 includes a number of components, including User Content Preference Model (UCPM), which is constructed from the content of web pages and documents that the user has seen in the past to generate a list of weighted topic terms using a standard term frequency/inverse document frequency metric (tf/idf). User-preference model 110 can also include the user's stated preferences for attributes within each type of activity. For example, within the EAT activity, the user can state their preference for each of a number of types of cuisine (American, Asian, etc.), price range, lively atmosphere, parking, smoking, etc. This list of attributes can be derived from common attributes found in restaurant reviews (a similar approach is used with content applicable to the other activities). User-preference model 110 can also infer preferences automatically over time using a mechanism similar to activity-model learning processes describe above.

Finally, recommendation module 112 uses information from activity model 108 and user-preference model 110 to recommend an activity to user 122 (step 212). In one embodiment of the present invention, for a given user and context, recommendation module 112 computes the value of each content item by combining results from a variety of models. When all items have been scored, the top N items are returned. Note that most existing recommendation systems rely on one model exclusively; this model is most likely a form of collaborative filtering and the internal implementation of this model can be quite complex.

In contrast, in one embodiment of the present invention, a final score for an item is computed based on the results of not one, but an arbitrary number of models. In this embodiment, a set generator maintains a list of all available models, and combines them in an ad-hoc fashion depending on the input it receives from other components of the system. The way models are combined can be specified in a set of rules, or this can be inferred from the current user's context. The set generator can also learn over time what models are most appropriate for a given user in a given context.

For example, one embodiment of the present invention combines the following model types.

(1) Collaborative filtering models, which use ratings to compute similarities between items. This type of model scores each item based on how similar users have rated it.

(2) Soft query models, which incorporate a user's expressed preferences, which might evolve over time. For instance, users might indicate that they particularly like Japanese food but tend to dislike noisy places. This type of model gives a high score to items that match these subjective preferences. The specific attributes of each activity type are taken into account when computing scores (e.g., cuisine is a relevant attribute for the EAT activity, which is not relevant for the BUY activity, where product type is more useful).

(3) Contextual-soft-query models. This model type works similarly to the soft query model type, but uses preferences learned from previous user behavior rather than from stated preferences.

(4) Distance-based models. In these models, given a distance range for a user (either explicitly entered by the user or inferred from their location traces), the model gives maximum utility to items within the range and uses an exponential decay function to rate the others.

(5) Content-preference models in which the recommender uses the previously described UCPM to measure the similarity of the content to the content which the user has previously viewed.

(6) Reading-based models, which indicate what items users are most likely to read, according to empirical results.

(7) Models that reduce the scores of items that have previously been seen (to reduce user boredom).

(8) A model that uses information from the content analysis techniques (described below) to boost scores for items related to the content. Using these models, the system computes a total, average score for each recommendable item and makes recommendations from the highest-rated content within each activity category.

Inference Process

Figure 3:
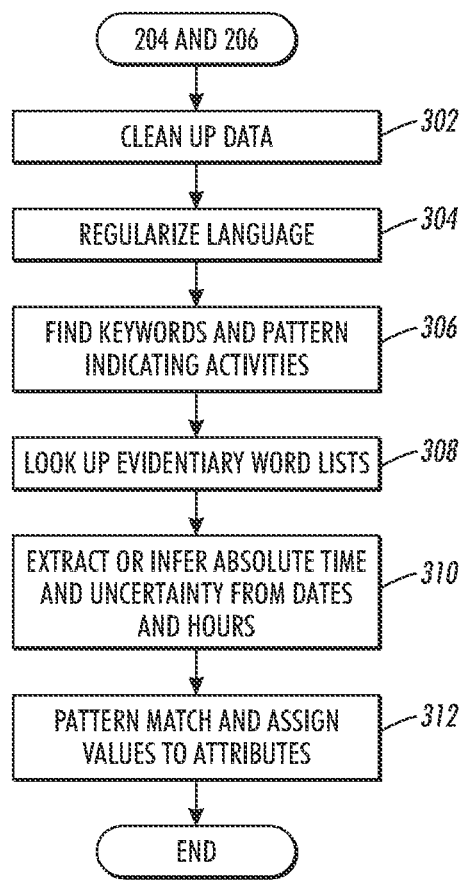
FIG. 3 presents a flow chart illustrating the process of using the activity-related keywords to infer message-related context information.

FIG. 3 presents a flow chart illustrating the process of using the activity-related keywords to infer message-related context information. This flow chart illustrates in more detail the operations involved in steps 204 and 206 of the flow chart in FIG. 2.

First, the system cleans up the data from the message (step 302). For example, this can involve removing extensible markup language (XML) code from the message along with trailing spaces. It can also involve "regularizing" white space and converting all characters into lower case.

Then the system "regularizes" the language, for example, by expanding out common abbreviations (step 304). For example, this can involve replacing the letter "u" between two white spaces with the word "you".

The system then identifies keywords and patterns in the message indicating activities (step 306). For example, the keyword "movie" in a message can indicate that the message involves a movie activity.

The system also compares words in the message against evidentiary word lists (step 308). These evidentiary word lists can, for example, include lists of words or patterns indicating tense information or opinions. It can also include lists of words from a database, wherein the words can, for example, specify activity locations, movie titles, cuisine types, restaurant names, etc.

The system also extracts or infers absolute time and uncertainty about time from the data (step 308). For example, the system can look for dates and hours in the data. The system can also put time expressions into a canonical form and can assign uncertainty values to the time expressions.

Finally, the system pattern matches with words in the message and based on the identified matches assigns values to attributes (step 312). For example, the attributes for the MOVIE activity can include:

ACTCAT: activity category;
ACTLOC: activity location;
ACTTIME: activity time;
UNCERTAINTY: uncertainty for the activity time;
TENSE: tense information for the message;
TITLE: movie title; and
OPINION: a user's opinion about a movie.

In another example, the attributes for the EAT activity can include:

ACTCAT: activity category;
SUBCAT: activity subcategory;
CUISINE-TYPE;
ACTLOC: activity location;
RESTAURANT-NAME;
ACTTIME: activity time;
UNCERTAINTY: uncertainty for the activity time;
TENSE: tense information for the message; and
OPINION: a user's opinion about a restaurant.

As an example, consider the text message

"hey joe . . . do you want to watch a movie tonight?"

This text message can cause the following attribute value assignments:

ACTCAT = MOVIE;
ACTLOC = NONE;
ACTTIME = 2007/05/25 20:00;
UNCERTAINTY = 2 hours;
TENSE = FUTURE;
TITLE = NONE;
OPINION = NONE.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for inferring activity-related context information from a message, comprising:
   scanning, by a computer, for a keyword in the message, wherein the keyword is associated with an activity category in a content database;
   determining that the keyword indicates the associated activity category;
   inferring message-related context information from the keyword in the message; and
   recommending an activity in the activity category based on the inferred message-related context information, wherein recommending the activity involves:
      identifying one or more content items associated with the keyword, wherein each content item corresponds to a recommendable activity;
      generating a combined model based on the message-related context information, wherein the combined model includes an activity model for one or more activities associated with the message-related context information, and includes a user preference model for the user;
      scoring the one or more content items using at least the activity model and the user preference model of the combined model; and
      returning a content item associated with a top score.

2. The method of claim 1, wherein scanning for the keyword in the message involves using the content database for guidance and looking for surrounding text which indicates the presence of the activity-related keywords in the message.

3. The method of claim 2, wherein looking for the surrounding text which indicates the presence of the activity-related keywords in the message involves looking for verbs which indicate specific types of activities in text surrounding prospective activity-related keywords in the message.

4. The method of claim 1, further comprising:
   identifying location and time indicators in the message; and
   using the identified location and time indicators to facilitate recommending the activity to the user.

5. The method of claim 1, wherein recommending the activity based on the inferred message-related context information involves using the message-related context information and the content database to enhance a keyword search to identify activities of interest for the user.

6. The method of claim 1, wherein the message-related context information includes typed terms.

7. The method of claim 6, wherein the typed terms include one or more of the following:
   an activity category;
   an activity location;
   an activity time;
   an uncertainty for the activity time;
   a tense associated with the message; and
   a user opinion about the activity.

8. The method of claim 1, wherein the content database includes activity-specific content related to one or more of the following activities:
   eating at restaurants;
   seeing movies and/or live performances;
   shopping at physical or online stores;
   reading books or online content; and
   performing other activities.

9. The method of claim 1, wherein the message is one of:
   a text message; or
   an email message.

10. A non-transitory computer-readable storage medium storing instructions that when executed by a computer cause the computer to perform a method for inferring activity-related context information from a message, the method comprising:
   scanning for a keyword in the message, wherein the keyword is associated with an activity category in a content database;
   determining that the keyword indicates the associated activity category;
   inferring message-related context information from the keyword in the message; and
   recommending an activity in the activity category based on the inferred message-related context information, wherein recommending the activity involves:—
      identifying one or more content items associated with the keyword, wherein each content item corresponds to a recommendable activity;
      generating a combined model based on the message-related context information, wherein the combined model includes an activity model for one or more activities associated with the message-related context information, and includes a user preference model for the user;
      scoring the one or more content items using at least the activity model and the user preference model of the combined model; and
      returning a content item associated with a top score.

11. The computer-readable storage medium of claim 10, wherein scanning for the keyword in the message involves using the content database for guidance and looking for surrounding text which indicates the presence of the activity-related keywords in the message.

12. The computer-readable storage medium of claim 11, wherein looking for the surrounding text which indicates the presence of the activity-related keywords in the message involves looking for verbs which indicate specific types of activities in text surrounding prospective activity-related keywords in the message.

13. The computer-readable storage medium of claim 10, wherein the method further comprises:
   identifying location and time indicators in the message; and
   using the identified location and time indicators to facilitate recommending the activity to the user.

14. The computer-readable storage medium of claim 10, wherein recommending the activity to the user using the message-related context information involves using the message-related context information and the content database to enhance a keyword search to identify activities of interest for the user.

15. The computer-readable storage medium of claim 10, wherein the message-related context information includes typed terms.

16. The computer-readable storage medium of claim 15, wherein the typed terms include one or more of the following:
   an activity category;
   an activity location;
   an activity time;
   an uncertainty for the activity time;
   a tense associated with the message; and
   a user opinion about the activity.

17. The computer-readable storage medium of claim 10, wherein the content database includes activity-specific content related to one or more of the following activities:
- eating at restaurants;
- seeing movies and/or live performances;
- shopping at physical or online stores;
- reading books or online content; and
- performing other activities.

18. The computer-readable storage medium of claim 10, wherein the message is one of:
- a text message; or
- an email message.

19. An apparatus that infers activity-related context information from a message, comprising:
- a processor;
- a parser configured to scan for a keyword in the message, wherein the keyword is associated with an activity category in a content database;
- an inference mechanism configured to:
  - determine that the keyword indicates the associated activity category; and
  - infer message-related context information from the keyword in the message; and
- a recommendation mechanism configured to recommend an activity in the activity category based on the inferred message-related context information, wherein while recommending the activity, the recommendation mechanism is configured to:
  - identify one or more content items associated with the keyword, wherein each content item corresponds to a recommendable activity;
  - generate a combined model based on the message-related context information, wherein the combined model includes an activity model for one or more activities associated with the message-related context information, and includes a user preference model for the user;
  - score the one or more content items using at least the activity model and the user preference model of the combined model; and
  - return a content item associated with a top score.

20. The apparatus of claim 19, wherein while scanning for the keyword in the message, the parser is configured to look for surrounding text which indicates the presence of the activity-related keywords in the message.

21. The method of claim 1, further comprising adjusting the weight associated with the keyword based on phrasal or positional information, which involves assigning the keyword a higher weight when the keyword is followed by a respective phrase than when the keyword is preceded by the phrase.

* * * * *